US012746663B2

(12) United States Patent
Romeo et al.

(10) Patent No.: US 12,746,663 B2
(45) Date of Patent: Sep. 29, 2026

(54) METHOD FOR CONTROLLING A GRIPPER

(71) Applicant: CAMOZZI AUTOMATION S.P.A., Brescia (IT)

(72) Inventors: Rocco Antonio Romeo, Genoa (IT); Luca Fiorio, Genoa (IT); Marco Rossi, Brescia (IT)

(73) Assignee: CAMOZZI AUTOMATION S.P.A., Brescia (IT)

( * ) Notice: Subject to any disclaimer, the term of this patent is extended or adjusted under 35 U.S.C. 154(b) by 154 days.

(21) Appl. No.: 18/284,105

(22) PCT Filed: Mar. 30, 2022

(86) PCT No.: PCT/IB2022/052941
§ 371 (c)(1),
(2) Date: Sep. 26, 2023

(87) PCT Pub. No.: WO2022/208384
PCT Pub. Date: Oct. 6, 2022

(65) Prior Publication Data
US 2024/0165800 A1 May 23, 2024

(30) Foreign Application Priority Data
Mar. 31, 2021 (IT) ........................ 102021000008006

(51) Int. Cl.
*B25J 9/16* (2006.01)

(52) U.S. Cl.
CPC .................................. *B25J 9/1633* (2013.01)

(58) Field of Classification Search
CPC ...... B25J 9/1633; B25J 13/083; B25J 9/1612; G05B 2219/39484; G05B 2219/39505; G05B 2219/39514; G05B 2219/39528; G05B 2219/39532; G05B 2219/39543; G05B 2219/40053
See application file for complete search history.

(56) References Cited

U.S. PATENT DOCUMENTS 8,515,579 B2 8/2013 Alcazar et al.
2009/0076657 A1* 3/2009 Tsuboi ................ G05B 13/021 700/275
2009/0285664 A1* 11/2009 Kim ...................... B25J 9/1612 414/730

(Continued)

FOREIGN PATENT DOCUMENTS

WO 2021015025 A1 1/2021

OTHER PUBLICATIONS

International Search Report, issued in PCT/IB2022/052941, mailed Sep. 9, 2022, Rijswijk, NL.

(Continued)

*Primary Examiner* — Adam R Mott
*Assistant Examiner* — Matthew C Gammon
(74) *Attorney, Agent, or Firm* — ArentFox Schiff LLP; Michael Fainberg

(57) ABSTRACT

A method for controlling grasping of an object by a gripper provides for computing a reference position of a grasped object with respect to a reference system integral with the gripper, and monitoring a position of the grasped object. If a displacement of the grasped object with respect to the reference position is detected, the method provides for commanding the gripper to increase grasping force.

14 Claims, 4 Drawing Sheets

(56) References Cited

U.S. PATENT DOCUMENTS

2021/0031377 A1 2/2021 Narita

OTHER PUBLICATIONS

Salisbury L. L.; Colman A. B., A mechanical hand with automatic proportional control of prehension, Medical and biological engineering, Sep. 1967, pp. 505-511, vol. 5, Pergamon Press, GB.
Baits J. C. et al., The Feasibility of an Adaptive Control Scheme for Artificial Prehension, Proceedings of the Institution of Mechanical Engineers, Conference Proceedings, Sep. 1968, pp. 54-59, vol. 183, Issue 10, Institution of Mechanical Engineers.
Francomano M. T. et al., Artificial Sense of Slip—A Review, IEEE Sensors Journal, Jul. 2013, pp. 2489-2498, vol. 13, Issue 7, IEEE.
Iolweg E. G. M. et al., Slip detection by tactile sensors: algorithms and experimental results, Proceedings of 1996 IEEE International Conference on Robotics and Automation, Minneapolis, MN, USA, Apr. 22-28, 1996, pp. 3234-3239, vol. 4, IEEE.
Zhang X; Liu R., Slip detection by array-type pressure sensor for a grasp task, Proceedings of the 2012 IEEE International Conference on Mechatronics and Automation, Chengdu, China, Aug. 5-8, 2012, pp. 2198-2202, IEEE.
Gunji D. et al., Grasping Force Control of Multi-fingered Robot Hand based on Slip Detection Using Tactile Sensor, 2008 IEEE International Conference on Robotics and Automation, Pasadena, CA, US, May 19-23, 2008, pp. 2605-2610, IEEE.
Hasegawa H. et al., Development of intelligent robot hand using proximity, contact and slip sensing, 2010 IEEE International Conference on Robotics and Automation, Anchorage, AK, US, May 3-7, 2010, pp. 777-784, IEEE.
Maldonado A. et al., Improving robot manipulation through fingertip perception, 2012 IEEE/RSJ International Conference on Intelligent Robots and Systems, Vilamoura-Algarve, Portugal, Oct. 7-12, 2012, pp. 2947-2954, IEEE.
Costanzo M. et al., Grasp Control for Enhancing Dexterity of Parallel Grippers, 2020 IEEE International Conference on Robotics and Automation (ICRA), Paris, France, 2020, pp. 524-530, IEEE.

* cited by examiner

METHOD FOR CONTROLLING A GRIPPER

CROSS-REFERENCE TO RELATED APPLICATIONS

This application is a National Phase Application of PCT International Application No. PCT/IB2022/052941, having an International Filing Date of Mar. 30, 2022 which claims priority to Italian Application No. 102021000008006 filed Mar. 31, 2021, each of which is hereby incorporated by reference in its entirety.

FIELD OF THE INVENTION

The present invention relates to a method for controlling a gripper for grasping an object, particularly for robotic applications.

BACKGROUND OF THE INVENTION

Automatic grippers suitable to grasp and carry an object are well known. Generally, grippers comprise a gripper body and at least two gripper fingers, also called “jaws” in technical jargon, which are movable with respect to the gripper body between an idle open position and a closed position for grasping an object.

One of the problems that automatic grippers suffer from is detecting the slippage of the grasped object between the jaws in a timely manner, so as to prevent it from being lost during transport or otherwise released not in the exact position where it was intended.

For this purpose, grippers equipped with sensors have been proposed.

The idea of adding slip measurement to artificial hands was first considered during the latter half of the 1960s. In L. L. Salisbury and A. B. Colman, A mechanical hand with automatic proportional control of prehension. Medical and biological engineering, 1967, the integration of a piezoelectric crystal in the thumb of a mechanical hand is described. Baits et al. replicated this device immediately after on a two-dimensional gripper (J. Baits et al., The Feasibility of an Adaptive Control Scheme for Artificial Prehension. Proceedings of the Institution of Mechanical Engineers, 1968).

The purpose was, in both cases, to detect vibrations due to slippage and to input a corresponding signal into the manipulator control loop. However, no experimental studies were performed to demonstrate the ability of such systems thus fitted with sensors to detect slippage.

Many other approaches were proposed in the following decades, as reported in M. Francomano et al., Artificial sense of slip—A review. IEEE Sensors, 2013. These include one approach that makes use of the center of pressure (CoP). The center of pressure may be reconstructed from an array of piezoresistive pressure sensors (E. Holweg et al., Slip detection by tactile sensors: algorithms and experimental results. ICRA 1996) or of capacitive sensors (X. Zhang and R. Liu, Slip detection by array-type pressure sensor for a grasp task. ICMA 2012), and then analyzed in the frequency domain through techniques such as Fast Fourier Transform (FFT) or Power Spectrum to assess the occurrence of a slip. Alternatively, the CoP may be measured by a specific sensor that also provides the total load applied thereon (D. Gungji et al., Grasping force control of multi-fingered robot hand based on slip detection using tactile sensor. Journal of the Robotics Society of Japan, 2007). The voltage output of the sensor was fed into the control circuit of a gripper: if a significant drop in this voltage was detected, the clamp increased the force applied. This approach has been integrated with a proximity sensor that measures the position of the object to be grasped by the gripper (H. Hasegawa et al., Development of Intelligent Robot Hand using Proximity, Contact and Slip sensing. ICRA 2010).

Slip may also be inferred using optical sensors. For example, said sensors were integrated into the fingertips of a robotic hand (DLR/HIT) connected to the right arm of a mobile robotic platform (TUM-Rosie) (A. Maldonado et al., Improving robot manipulation through fingertip perception. IROS 2012). The sensor consisted of a miniature camera and a laser emitter. The fingertip thus equipped allowed the recognition of slip events when the surface of the grasped object moved with respect to the sensor target.

In U.S. Pat. No. 8,515,579B2, a gripper is provided with instrumentation to manipulate grasped objects. The gripper has sensors to determine a vector field based on spatially distributed data in time, measured at different positions on the grasped object. However, the position of objects is not evaluated prior to the grasping action.

Thus, the problem of correct and timely detection of the slippage of an object grasped by a clamp has not been completely solved.

SUMMARY OF THE INVENTION

Therefore, the object of the present invention is to propose a method for controlling a gripper, particularly a gripper for robotic applications, that is able to solve this problem.

Said object is achieved by a method for controlling the grasping of an object by a gripper and by of a gripper as described and claimed herein.

Preferred or advantageous embodiments of the control method and of the gripper are also described.

According to a general embodiment, the control method comprises the steps of:

a) commanding the gripper to grasp the object with a predetermined grasping force (F1);
b) measuring the effective grasping force (Fm);
c) when the difference between the predetermined grasping force and the effective grasping force is less than a predetermined threshold value (ThF), computing a reference position of the grasped object with respect to a reference system integral with the gripper;
d) monitoring the position of the grasped object;
e) if a displacement of the grasped object with respect to the reference position is detected, commanding the gripper to increase the grasping force.

In one embodiment, after step e), the method is repeated from step d).

In one embodiment, the reference position is detected by means of at least one position sensor and/or at least one center of pressure sensor.

According to an embodiment, the reference position is computed as an average of a set of measurements obtained, in a predetermined time interval, from the at least one position sensor and/or the at least one center of pressure sensor.

In some embodiments, a displacement of the grasped object with respect to the reference position is detected if the difference between a position datum obtained from the at least one position sensor and the reference position is greater than a predetermined threshold value and/or if the difference between a position datum obtained from the at least one center of pressure sensor and the reference position is greater than a predetermined threshold value.

According to a general aspect of the invention, a gripper is proposed, comprising:

a gripper body;

at least two gripper jaws which are movable with respect to the gripper body between an idle open position and a closed position for grasping an object;

at least one proximity sensor suitable to detect the presence of the object to be grasped within the field of view of the at least one proximity sensor;

a grasping force sensor, suitable for measuring the grasping force exerted by the jaws on the object;

at least one center of pressure sensor, suitable to detect the coordinates of the center of pressure between the gripper jaws when the jaws exert a grasping force on the object;

a processing unit programmed to carry out a method for controlling the gripper comprising the steps of:

a) commanding the gripper to grasp the object with a predetermined grasping force (F1);

b) measuring the effective grasping force (Fm) by means of the grasping force sensor;

c) when the difference between the predetermined grasping force and the effective grasping force is below a predetermined threshold value (ThF), computing, using measurements received from the at least one position sensor and/or from the at least one center of pressure sensor, a reference position of the grasped object with respect to a reference system integral with the gripper;

d) monitoring the position of the grasped object;

e) if a displacement of the grasped object with respect to the reference position is detected, commanding the gripper to increase the grasping force.

In one embodiment, the processing unit is programmed to repeat the control method from step d) after performing step e).

In one embodiment, the processing unit is programmed to compute the reference position as an average of a set of measurements obtained, over a predetermined time interval, from the at least one position sensor and/or the at least one center of pressure sensor.

BRIEF DESCRIPTION OF THE FIGURES

Further features and advantages of the control method and of the gripper according to the invention shall be made readily apparent from the following description of preferred embodiments thereof, provided purely by way of non-limiting example, with reference to the accompanying figures, wherein.

DETAILED DESCRIPTION

Figure 1:
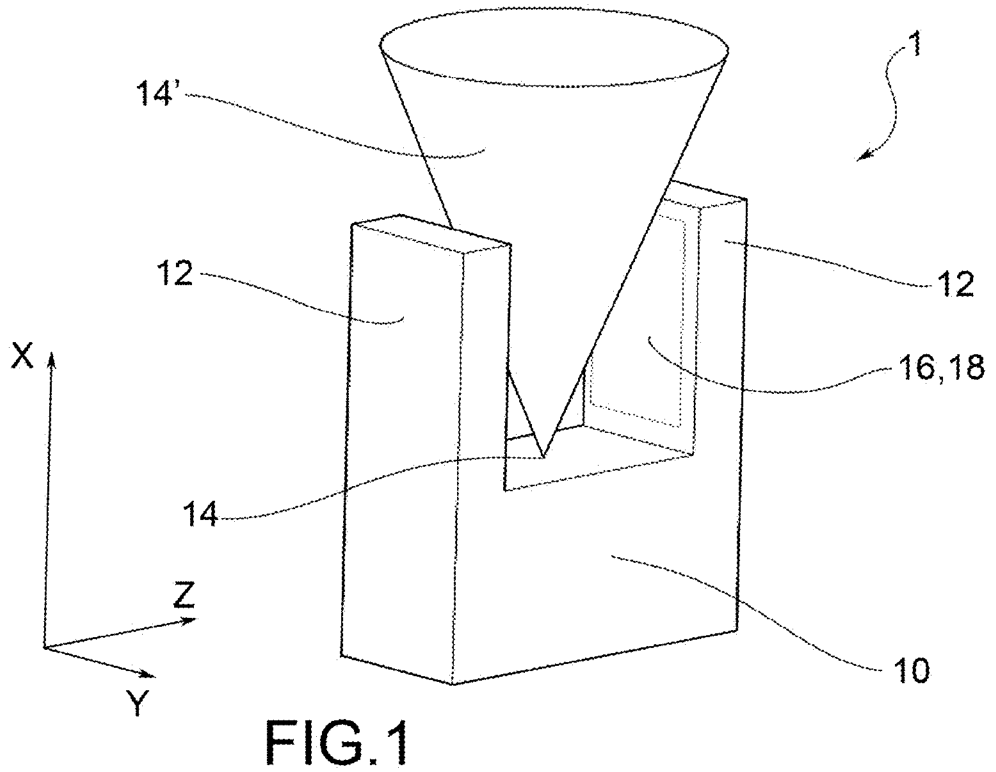
FIG. 1 shows a gripper schematically.

In said drawings, a gripper for grasping an object according to the invention has been indicated schematically as a whole with the reference number 1.

The gripper 1 comprises a gripper body 10 and at least two gripper jaws 12 which are movable with respect to the gripper body 10 between an idle open position and a closed object-grasping position.

The jaws 12 may be moved by electric, hydraulic, pneumatic actuators, or combinations thereof.

The gripper 1 is provided with at least one proximity sensor 14 suitable to detect the presence of the object to be grasped within the field of view 14' of the proximity sensor 14.

For example, the proximity sensor 14 is positioned to direct the field of view 14', e.g., conical in shape, between the two jaws 12.

Figure 2:
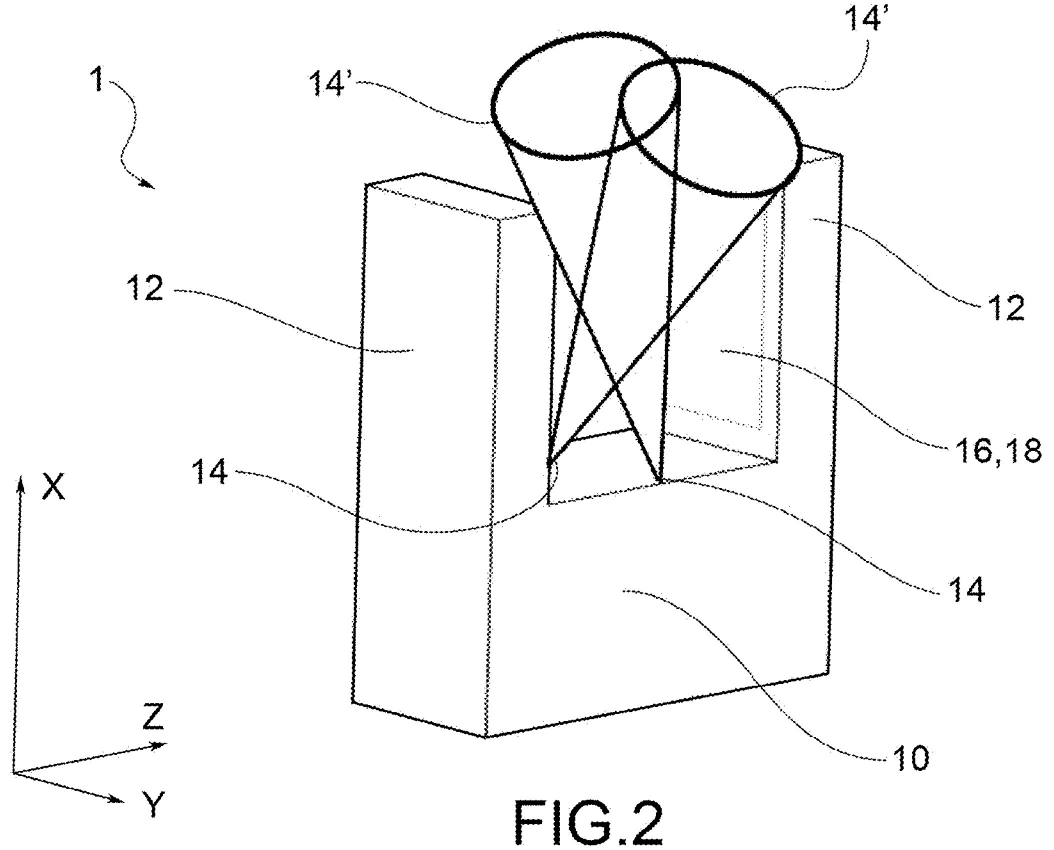
FIG. 2 shows the gripper of FIG. 1 in a variant embodiment with two proximity sensors.

In the embodiment of FIG. 2, the gripper 1 is provided with two proximity sensors 14 so as to expand the field of view of the gripper.

The gripper 1 is further provided with a grasping force sensor 16 ("FS"), suitable to measure the grasping force exerted by the jaws 12 on the object, and at least one center of pressure sensor 18 ("CoPS"), suitable to detect the coordinates of the center of pressure ("CoP") between the jaws 12 of the gripper when the jaws exert a grasping force on the object.

In one embodiment, the force sensor 16 and the center of pressure sensor 18 coincide.

The gripper 1 is controlled by a processing unit [20] operationally connected to the proximity sensor 14, the grasping force sensor 16, the center of pressure sensor 18, and the jaws 12, and programmed to carry out a method for controlling the gripper based on information received from the sensors.

The processing unit may be located within the gripper body 10, but may also be located externally to the gripper 1.

The control method described below enables the gripper 1 to stably grasp an object and to avoid slippage phenomena when the gripper holds said object between its jaws.

The following definitions will be used in the remainder of this description:

Fm: grasping force measured with the grasping force sensor;

F1, F2: predetermined values of the desired grasping force;

ThF: threshold value of the grasping force below which the grasp may be considered stable;

ThPos1, ThPos2: threshold values of the position detected by the proximity sensor;

ThCoP: threshold value of the center of pressure.

As mentioned above, in one embodiment the at least one center of pressure sensor 18 coincides with the grasping force sensor 16. In this case, the effective grasping force (Fm) sensor is also able to measure torque. In fact, considering the X, Y, and Z axes as depicted in the figures, the processing unit is programmed to compute the CoPX and CoPY coordinates of the center of pressure as:

$$\begin{cases} CoP_X = \dfrac{M_Y}{|F_Z|} \\ CoP_Y = \dfrac{M_X}{|F_Z|} \end{cases}$$

where $M_X$ and $M_Y$ are the measured moments of the effective grasping force sensor (Fm) along the X and Y axes, respectively, as shown in the figures, and where $|F_Z|$ is the modulus of the effective grasping force (Fm) along the Z axis.

In one embodiment, the proximity sensor 14 is an ultrasonic or infrared sensor.

In one embodiment, the force sensor 16 and/or the center of pressure sensor 18 are made with a sensor unit array, such as of a capacitive type, so as to make a tactile skin, and/or with a force/torque sensor.

Figure 3:
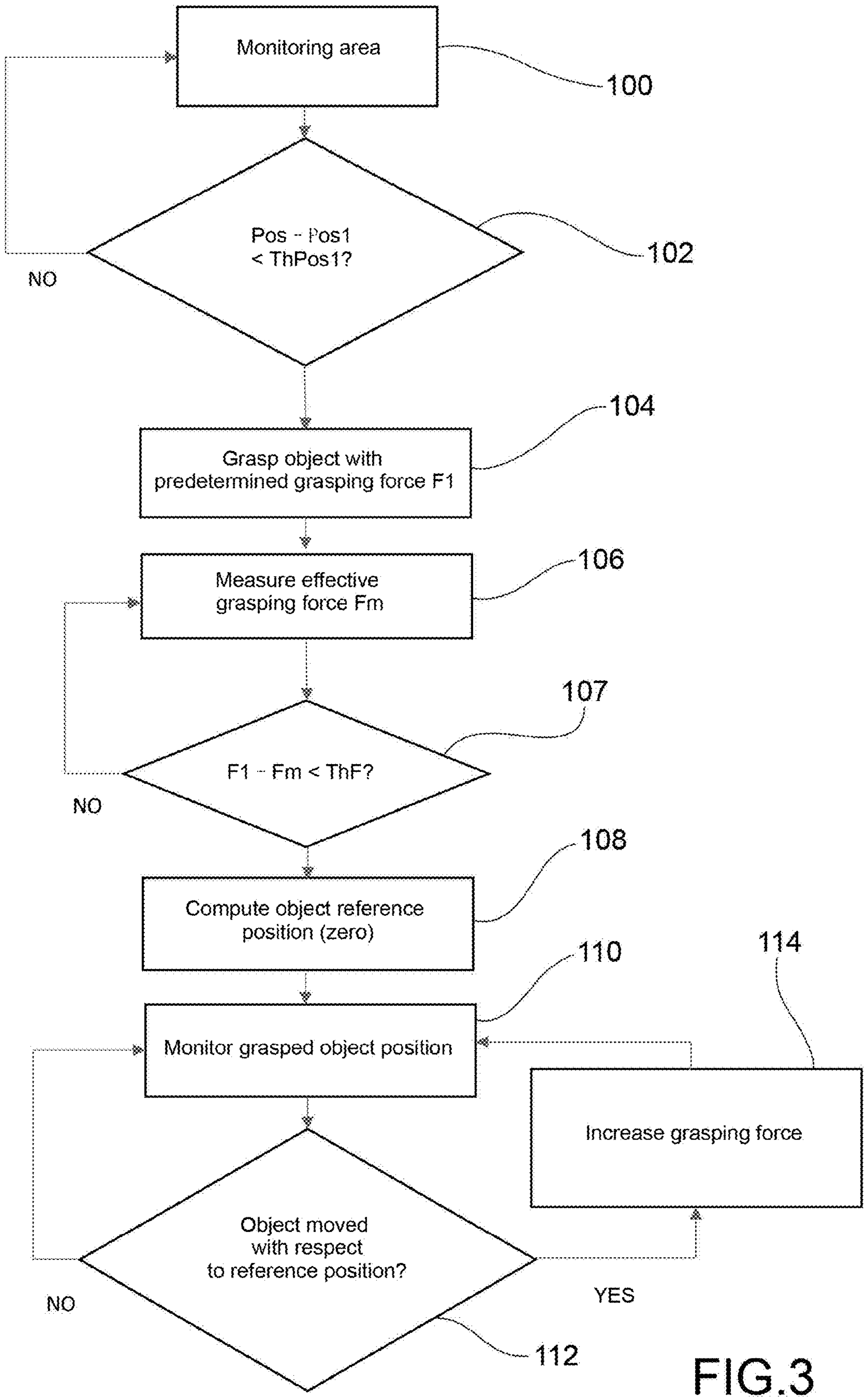
FIG. 3 is a flow chart of the method for controlling the grasping of an object according to the invention.

Referring to the flowchart in FIG. 3, in one embodiment, the method for controlling the gripper comprises the following steps.

The gripper, by means of the proximity sensor(s) 14, monitors a grasping area to detect the presence of the object to be grasped (step 100).

Once an object has been detected, a comparison is made between the position of the object to be grasped (Pos) and a predetermined grasping position (Pos1) (step 102). The predetermined grasping position may be defined as the position the object must assume in order to be grasped correctly.

When the distance between the object position (Pos) and the grasping position (Pos1) is less than a predetermined threshold value (ThPos1), the gripper is commanded to grasp the object with a predetermined grasping force F1 (step 104).

The effective grasping force (Fm) is then measured (step 106). The grasping force sensor 16 may be used to measure the actual grasping force (Fm).

A comparison is then made between the predetermined grasping force (F1) and the effective grasping force (Fm) (step 107).

When the difference between the predetermined grasping force (F1) and the effective grasping force (Fm) is less than a predetermined threshold value (ThF), a reference position of the grasped object (or "zero" position) with respect to a reference system integral to the gripper is computed (step 108).

The position of the grasped object is then monitored as the object is transported from the pickup point to a release point (step 110).

If a displacement of the object from the reference position (step 112) is detected, the gripper is commanded to increase the grasping force (step 114), for example to a second predetermined grasping force value (F2).

In some applications, monitoring the grasping area and comparing the position of the object to be grasped (Pos) to a predetermined grasping position (Pos1) may not even be required. In these cases, the control method provides, as the first step, for directly grasping the object with a predetermined grasping force F1 (step 104).

In one embodiment, after increasing the grasping force, the reference position of the object is again monitored. If another displacement is detected, the grasping force is increased further. This closed-loop control may then be repeated several times until the gripper has reached the release position of the object.

In some embodiments, the increase in grasping force is performed continuously, such as through a PID-type control. In these embodiments, for example, the gripper comprises proportional control means controllable by the processing unit to continuously control the grasping force.

In one embodiment, the reference position is detected by the one or more position sensors, such as said proximity sensors 14, and/or the center of pressure sensor(s) 18.

In one embodiment, the reference position is computed as an average of a set of measurements obtained, in a predetermined time interval of, for example, one or two seconds, from the at least one position sensor and/or the at least one center of pressure sensor.

For example, a displacement of the object with respect to the reference position is detected if the difference between a position datum obtained from the at least one position sensor and the reference position is greater than a predetermined threshold value, and/or if the difference between a position datum obtained from the at least one center of pressure sensor and the reference position is greater than a predetermined threshold value.

Figure 4:
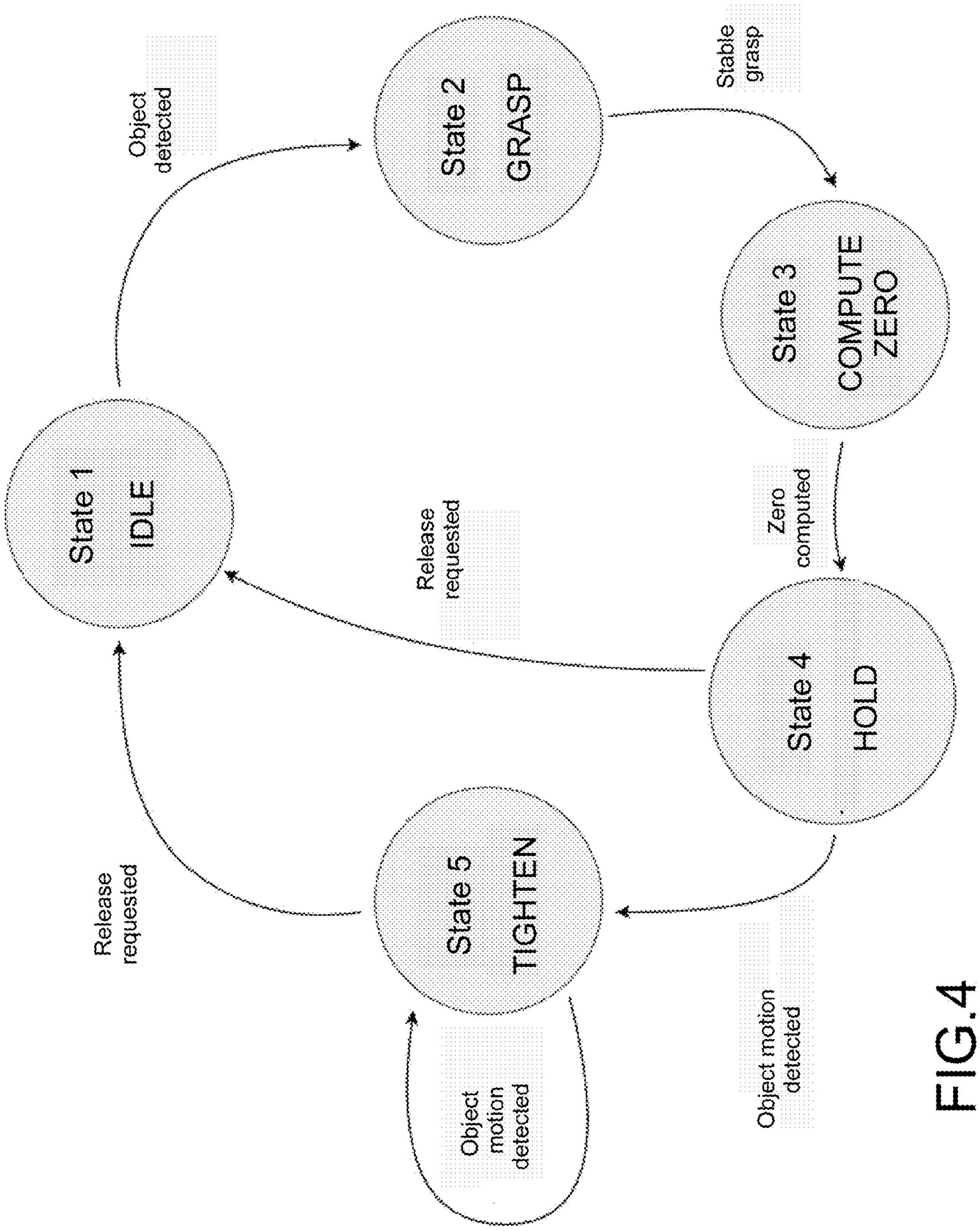
FIG. 4 is a diagram of a state machine implementing the control method.
Figure 5:
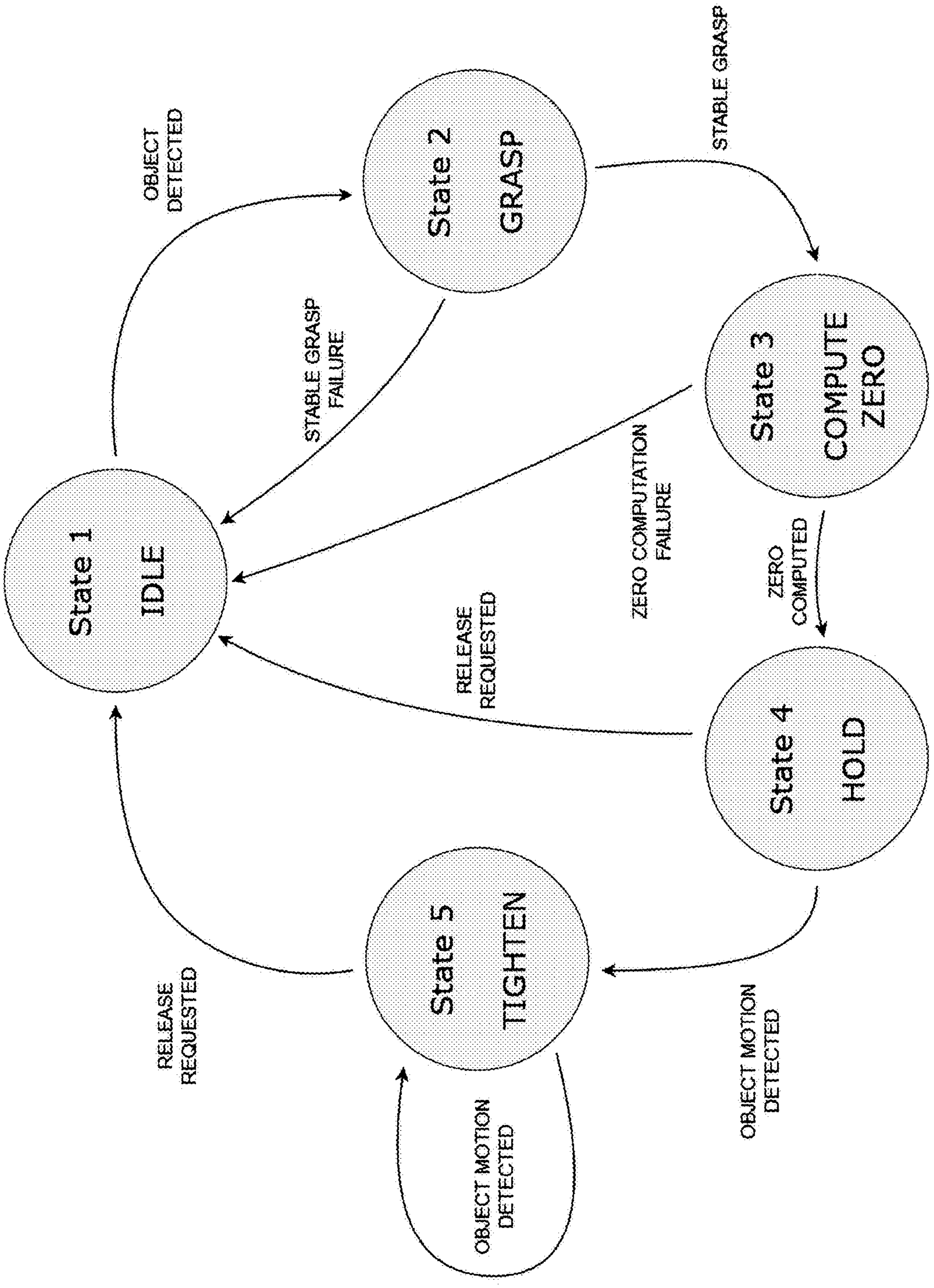
FIG. 5 is a variant of the diagram of a state machine of FIG. 4.

In one embodiment, the control method described above is implemented with a finite state machine, the state diagram of which is depicted in FIGS. 4 and 5.

The five states are as follows:

- State 1—IDLE. The jaws 12 of the gripper are open and no operation is performed. The proximity sensor 14 constantly monitors the grasping area to detect objects to be grasped.
- State 2—GRASP. The processing unit generates the desired force level F1. The gripper grasps the object but a stable grasp is not yet obtained, i.e., $|F1-Fm|>ThF$.
- State 3—COMPUTE ZERO. The reference position (Zero) of the object is computed.
- State 4—HOLD. The gripper grasps the object and checks if the grasp is stable.
- State 5—TIGHTEN. The desired force level F2 is generated by the processing unit. The gripper increases the force exerted on the object to prevent it from slipping.

In one embodiment illustrated in the diagram in FIG. 4, the transition conditions between states are described below:

- OBJECT DETECTED. The position of the object, between the gripper jaws, is below a certain threshold such that Pos<ThPos1. In some embodiments, other parameters (e.g., the variance of the Pos quantity) may also be evaluated.
- STABLE GRASP. The grasping force is considered stable, i.e. $|F1-Fm|<ThF$.
- ZERO COMPUTED. The "zero" position is computed when the grasping force is stable. In some embodiments, the zero position is the average of a number of samples obtained from the proximity sensor and/or the center of pressure sensor, over a predetermined time interval, such as one or two seconds.
- OBJECT MOTION DETECTED. A motion of the grasped object is detected when the object position and/or the norm of the CoP vector is away from the "zero" reference position, i.e.: $(Pos-Zero)>ThPos2$ and/or $(\|CoP\|-Zero)>ThCoP$.
- RELEASE REQUESTED. The gripper is commanded to release the object. This happens when the grasping operation is finished. This condition may occur even without involving the state 4, i.e., without there being a detection of a displacement of the object from the reference position.

In the embodiment of FIG. 5, the following additional transition conditions are also shown:

- STABLE GRASP FAILURE: If the grasping force is considered unstable, i.e. $|F1-Fm|>ThF$, the state machine returns to the idle state 1;
- ZERO COMPUTATION FAILURE: If the computation of the "zero" position is not completed successfully, the grasping device will not continue the action of grasping and moving the workpiece. The grasping operation will then have to begin again. The user may restart it manually, or the robotic system may be programmed to automatically restart the grasping operation by restarting from the idle state 1. For example, the successful computation of the zero entails an indicator light on a control monitor being lit. If said light remains off for a user-definable period of time, such as 10 seconds, the grasping operation restarts from the beginning.

Therefore, the grasp control algorithm allows for:

- recognizing when the object is in the correct position for grasping;

recognizing when the grasped object is properly held between the gripper jaws;

recognizing if the grasped object is moving, so as to prevent it from slipping.

The algorithm therefore controls the gripper from the step of checking for the presence of an object between its jaws, and thus even before starting the actual grasping operation, until the completion of said grasping operation.

In the IDLE state, the gripper does nothing and “waits” to begin a grasping operation. When the position of the object is considered correct, i.e., the proximity sensor output is in the allowable range, the gripper is commanded to grasp the object.

Before moving to the next state, the stability of the grasp is checked. The stability is ensured by controlling the measured force, which must be close to the desired force (F1).

When this happens, with the object stably grasped between the gripper jaws, a reference position is computed. For this purpose, the position of the object is observed for a predetermined time interval, such as a couple of seconds. The reference position or “zero” may be computed as the average of the corresponding number of measurements taken. The reference position is then used in the “hold” state, and possibly in the “tighten” state.

In fact, in the “hold” state, any motion of the object with respect to the zero reference position thus computed will be compensated by increasing the grasping force to a second level F2. For this purpose, a closed-loop force control algorithm may be employed.

The OBJECT MOTION DETECTED transition may occur multiple times and may be compensated for by iterating the “TIGHTEN” state, even with multiple force levels greater with respect to the second force level F2.

In one embodiment, the “zero” position is computed as follows:

$$\text{zero} = \frac{\sum_k CoP_k}{n}$$

where CoPk is a vector containing the two components of CoP at the instant k, while n is the total number of CoPk values accumulated in a fixed time interval, also user-definable. Regardless of the length of the observation window, consisting of k norm values of the CoP, the grasping device will have to wait for these values to be collected in order to compute the zero position. The zero position, therefore, is updated with each new grasping operation.

Once the zero position is available, the algorithm provides for the grasping of the workpiece (HOLD). Only at this point will the processing unit of the grasping device evaluate, at each instant, the possible slippage of the workpiece.

In one embodiment, the norm D of the difference vector between the CoP and the zero position is evaluated against the predefined threshold. In formulas, this will be:

$$D = \|\text{zero} - CoP_i\|, \text{ where}$$

Zero=$[x_0, y_0]$ $CoP_i = [x_i, y_i]$ $CoP_i$ is defined as the value of the CoP at the i-th instant, after computing the zero position. If and only if D exceeds a predefined threshold will the OBJECT MOTION DETECTED transition take place as a result of the detected slippage of the grasped workpiece.

The proposed control method achieves the intended purpose.

The grasping systems of the state of the art do not check whether the grasped object is grasped stably. The object is picked up and held without knowing whether the applied force matches the desired force (see, e.g., Costanzo et al., 2020). The control method according to the present invention solves this problem by instead checking whether the effective grasping force is close to a predetermined grasping force (STABLE GRASP transition: $|F1-Fm|<ThF$).

The grasping systems of the state of the art do not compute a reference position of the grasped object (as, for example, in Hasegawa et al., 2010). This may cause uncertainty in grasping. The present invention solves this problem by computing a reference position of the object when it is stably grasped. Once computed, this position does not change during the operation of the gripper.

In the grasping systems of the state of the art, when the center of pressure is used to detect slippage phenomena, it is measured by an additional sensor with a voltage output (see, for example, Hasegawa et al., 2010). In a preferred embodiment, the present invention solves this problem because both grasping force and center of pressure (CoP) are measured by the same sensor.

The control method according to the invention makes it possible to recognize when the object is in the correct position to be grasped.

By detecting the center of pressure, it is possible to know where the applied pressure is concentrated.

According to the proposed control method, a reference position of the grasped object is computed, with respect to which any displacement is then detected, only when the object is stably grasped.

The method according to the invention recognizes when the object moves from the reference position and applies a force correction accordingly.

A person skilled in the art may make several changes, adjustments, adaptations, and replacements of elements with other functionally equivalent ones to the embodiments of the method for controlling the grasping of an object and of the gripper according to the invention in order to meet incidental needs, without departing from the scope of the following claims. Each of the features described as belonging to a possible embodiment may be obtained independently of the other described embodiments.

What is claimed is:

1. A method for controlling grasping of an object by a gripper, the method comprising steps of:

a) commanding the gripper to grasp the object with a predetermined grasping force;

b) measuring an effective grasping force;

c) verifying that a stable grasp of the object is achieved by determining that a difference between the predetermined grasping force and the effective grasping force is below a predetermined threshold value;

d) subsequent to verifying that the stable grasp is achieved, computing a stable reference position of the grasped object, wherein the stable reference position is computed as an average of a set of measurements obtained over a predetermined time interval by at least one position sensor and/or by at least one center of pressure sensor;

e) storing the computed stable reference position in a memory;

f) monitoring a position of the grasped object; and g) if a displacement of the grasped object with respect to the stored stable reference position is detected, commanding the gripper to increase grasping force.

2. The method of claim 1, wherein, following step g), the method is repeated from step f).

3. The method of claim 1, wherein the displacement of the grasped object with respect to the stored stable reference position is detected if a difference between a position datum obtained by the at least one position sensor and the stored stable reference position is above a predetermined threshold value and/or if a difference between a position datum obtained by the at least one center of pressure sensor and the stored stable reference position is above a predetermined threshold value.

4. The method of claim 1, wherein, if the stable reference position is computed using the at least one center of pressure sensor, a grasping force sensor for detecting the effective grasping force is used as the center of pressure sensor, the grasping force sensor being suitable to carry out torque measurements, CoPx and CoPy coordinates of a center of pressure (CoP) being computed as:

$$\begin{cases} CoP_X = \frac{M_Y}{|F_Z|} \\ CoP_Y = \frac{M_X}{|F_Z|} \end{cases}$$

Mx and My being measured moments of the effective grasping force according to X and Y axes, respectively, and |Fz| being a modulus of the effective grasping force along a Z axis.

5. The method of claim 1, wherein step a) is preceded by steps of: monitoring a grasping area to detect a presence of the object to be grasped; comparing a position of the object to be grasped with a predetermined grasping position, the predetermined grasping position being a relative position or pose between the object and the gripper appropriate to initiate grasping; and wherein step a) is carried out when a distance between the position of the object to be grasped and the predetermined grasping position is below a predetermined threshold value.

6. The method of claim 1, wherein, during step g), an increase of the grasping force is carried out continuously.

7. A gripper, comprising:

a gripper body;

at least two grasping jaws movable with respect to the gripper body between an idle open position and a closed position for grasping an object;

at least one proximity sensor suitable to detect a presence of the object to be grasped within a field of vision of the at least one proximity sensor;

a grasping force sensor, suitable to measure a grasping force exerted by the grasping jaws on the object;

at least one center of pressure sensor, suitable to detect coordinates of a center of pressure between the grasping jaws of the gripper when the grasping jaws exert the grasping force on the object;

and a processing unit comprising a memory and programmed to carry out a method for controlling the gripper, the method comprising steps of:

a) commanding the gripper to grasp the object with a predetermined grasping force;

b) measuring an effective grasping force by the grasping force sensor;

c) verifying that a stable grasp of the object is achieved by determining that a difference between the predetermined grasping force and the effective grasping force is below a predetermined threshold value;

d) subsequent to verifying that the stable grasp is achieved, computing a stable reference position of the grasped object by computing an average of a set of measurements obtained over a predetermined time interval from the at least one position sensor and/or the at least one center of pressure sensor;

e) storing the computed stable reference position in the memory;

f) monitoring a position of the grasped object; and g) if a displacement of the grasped object with respect to the stored stable reference position is detected, commanding the gripper to increase the grasping force.

8. The gripper of claim 7, wherein the processing unit is programmed to repeat the method for controlling the gripper from step f) after having carried out step g).

9. The gripper of claim 7, wherein the at least one center of pressure sensor coincides with the grasping force sensor, the grasping force sensor being suitable to carry out torque measurements, the processing unit being programmed to compute CoPx and CoPy coordinates of the center of pressure (CoP) as:

$$\begin{cases} CoP_X = \frac{M_Y}{|F_Z|} \\ CoP_Y = \frac{M_X}{|F_Z|} \end{cases}$$

Mx and My being measured moments of the effective grasping force according to X and Y axes, respectively, and |Fz| being a modulus of the effective grasping force along a Z axis.

10. The gripper of claim 7, wherein the at least one proximity sensor is an ultrasonic or infrared sensor.

11. The gripper of claim 7, wherein the processing unit is also programmed to: monitor a grasping area, by the at least one proximity sensor, to detect the presence of the object to be grasped; compare a position of the object to be grasped with a predetermined grasping position, the predetermined grasping position being a relative position or pose between the object and the gripper appropriate to initiate grasping; and command the gripper to grasp the object with the predetermined grasping force when a distance between the position of the object to be grasped and the predetermined grasping position is below a predetermined threshold value.

12. The gripper of claim 7, further comprising proportional control means commandable by the processing unit to continuously control the grasping force.

13. The gripper of claim 7, wherein the grasping force sensor and/or the center of pressure sensor are made with a sensor unit array so as to provide a tactile skin, and/or with a force/torque sensor.

14. The gripper of claim 13, wherein the sensor unit array is of the capacitive type.

* * * * *